OR 3,765,749

United States [11] 3,765,749
LaMacchia [45] Oct. 16, 1973

[54] OPTICAL MEMORY STORAGE AND RETRIEVAL SYSTEM

[75] Inventor: John Thomas LaMacchia, Berkeley Heights, N.J.

[73] Assignee: Bell Telephone Laboratories, Incorporated, Murray Hill, N.J.

[22] Filed: May 23, 1972

[21] Appl. No.: 255,990

[52] U.S. Cl...... 350/161, 340/173 LM, 340/173 TP, 356/71
[51] Int. Cl........... G11c 13/04
[58] Field of Search.......... 356/71; 350/161, 350/167; 340/173 LM, 173 TP

[56] References Cited

UNITED STATES PATENTS

| | | | |
|---|---|---|---|
| 3,637,307 | 1/1972 | Spitz | 350/167 |
| 3,555,987 | 1/1971 | Browning | 350/167 |
| 3,593,318 | 7/1971 | Browning | 340/173 LM |
| 3,631,409 | 12/1971 | Buchan | 340/173 LM |
| 3,676,864 | 7/1972 | Maure et al. | 340/173 LM |
| 3,286,025 | 11/1966 | Ingersoll | 340/173 TP |

*Primary Examiner*—David Schonberg
*Assistant Examiner*—V. P. McGraw
*Attorney*—W. L. Keefauver

[57] ABSTRACT

An optical memory element capable of recording many pages of information is provided by locating a thermoplastic (heat-deformable) resin memory sheet between a pair of fly's eye lenses. One of these lenses serves the purpose of focusing readout optical radiation incident on a single desired page of the memory sheet, the readout optical radiation coming from one of a plurality of light sources, each of which correspond to a page of the memory sheet. The other fly's eye lens focuses a page of write-in optical radiation onto the corresponding page of the memory element; and this second lens also serves the purpose of focusing the readout optical radiation after propagating through both the memory element and a Schlieren stop located between the memory sheet and this fly's eye lens. An array of optical detectors, onto which the readout beam of optical radiation is focused, reads out a page of information at a time, corresponding to the particular one of the readout optical sources which is energized at that time.

8 Claims, 1 Drawing Figure

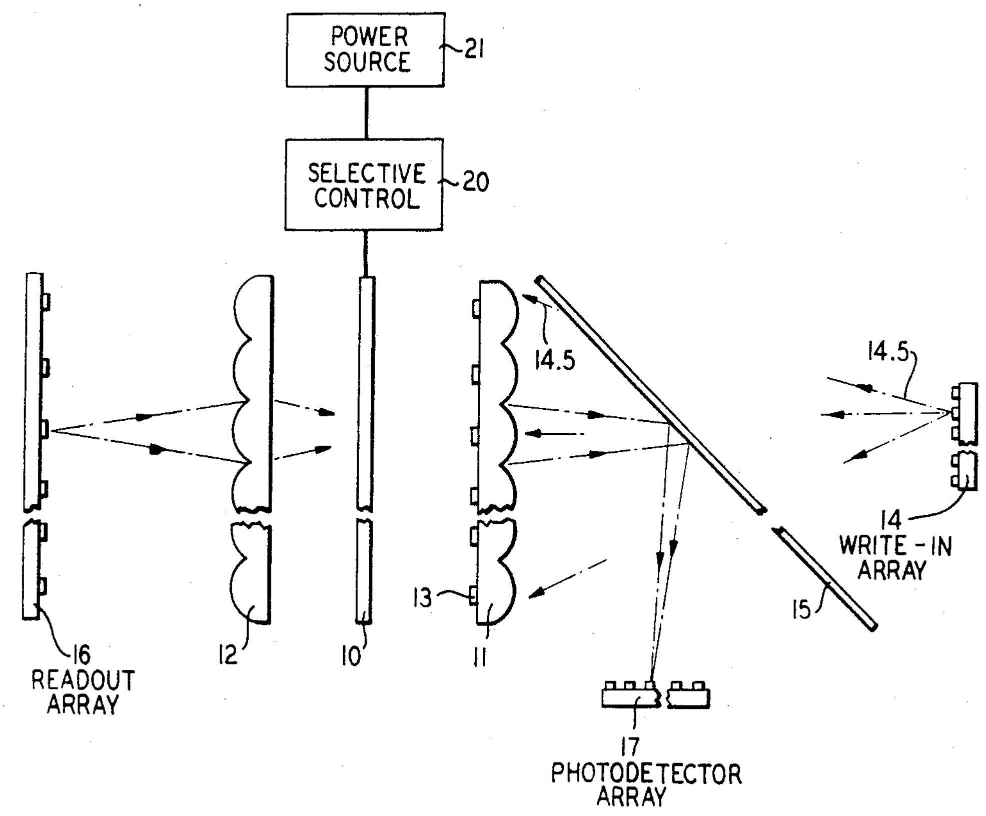
POWER SOURCE
21
SELECTIVE CONTROL
20
14.5
14.5
14
WRITE - IN ARRAY
13
15
16
READOUT ARRAY
12
10
11
17
PHOTODETECTOR ARRAY

OPTICAL MEMORY STORAGE AND RETRIEVAL SYSTEM

BACKGROUND OF THE INVENTION

1. Field of Invention

This invention relates to the field of optical memory systems and, more particularly, to memory devices in which the information is optically recorded and optically interrogated.

BACKGROUND OF INVENTION

In U.S. Pat. No. 3,593,318 issued on July 13, 1971 to I. Browning, there is disclosed an optical memory system which includes an optically interrogated, as well as optically recorded, information storage and retrieval device. In that system, a photographic emulsion is employed which is capable of being written in with many pages of information, such as pages of an ordinary book, each page containing many bits of information in the form of optically absorbing versus nonabsorbing portions. However, in the system disclosed in that patent, only one bit of information at a time can be interrogated (read out) and, therefore, the speed of the readout process is limited. Therefore, it woul.d be desirable to have an optically interrogated and optically recorded information storage device which is capable of incorporation in a system in which a full page of information can be read out at one moment of time.

SUMMARY OF THE INVENTION

In order to achieve an optical memory system capable of both write-in and readout of a full page of information at one time, an optical memory sheet of material is utilized whose transmission properties can be modified by optical radiation; such as a memory sheet comprising a thermoplastic resin film. This memory sheet is located between a pair of fly's eye lenses (multiple lenslets forming a matrix). One of the fly's eye lenses serves the purpose of focusing a beam of readout optical radiation on a desired portion (page) of the memory sheet. The other fly's eye lens serves the purposes of both focusing a write-in beam of optical radiation on the desired page portion of the memory sheet, as well as focusing the readout optical radiation onto an array of optical detectors.

In a specific embodiment of this invention, an optical memory sheet is located between first and second fly's eye lenses. This optical memory sheet is advantageously characterized by the property that a single page portion of the sheet can be permanently written in with information contained in the bright or dark regions of the cross section of an optical beam, by making this page portion selectively (locally) responsive at any desired instant of time to an incident pattern (page) of write-in optical radiation. For example, as described by L. H. Lin and H. L. Beauchamp, in a publication entitled "Write-Read-Erase in Situ Optical Memory Using Thermoplastic Holograms," published in *Applied Optics*, Vol. 9, No. 9, Sept. 1970, p. 2088 at p. 2090, the memory sheet can take the form of a thermoplastic resin combined with a photoconductor in a film structure. This thermoplastic-photoconductor film is provided with suitable electrodes for localized joule heating, to develop the latent image (a pattern of electrical charges in the photoconductor-thermoplastic film) produced by the pattern of write-in optical radiation. That is, the heat pulse produces in the thermoplastic material a pattern of thickness variations corresponding to the variations in intensity (information) along the cross section of the write-in optical beam. The desired write-in beam containing the information to be stored, one page at a time, is provided by an optical image pattern of an array of optical sources focused upon the photoconductor film in the memory sheet. The write-in array typically comprises an array of light emitting diodes, which can be energized in accordance with a pattern of bits of information corresponding to the given page. The optical radiation from this array of write-in optical sources is focused by the lenslets of first fly's eye lens onto the memory sheet, but only a portion of this sheet (corresponding to the desired page) is selectively developed in accordance with the pattern this write-in optical radiation, by means of localized joule heating pulses which are sufficient to cause the thermoplastic film to change thickness. This change in thickness is caused by the electrostatic forces produced by the electrostatic charge pattern induced by the write-in optical radiation in the photoconductor. Advantageously, the memory sheet is treated with a corona discharge to provide these electrostatic charges which are modified by the write-in optical radiation. Thereby, a page of information in the form of bits of information, corresponding to optical scattering and nonscattering bit subregions, is stored only in the selected page portion of the thermoplastic sheet.

Readout of such a page of information, at one moment of time, is achieved by energizing a single optical source in an array of optical sources, each of which is incident upon only one lenslet of the second fly's eye lens focused on the thermoplastic sheet at the location corresponding to the page of information to be read out. An array of Schlieren stops is located between the first fly's eye lens and the thermoplastic memory sheet, such that read-out radiation which is not scattered by the memory sheet is absorbed by the stops. The readout radiation, in accordance with the wave front as disturbed (optically scattered) by the thermoplastic sheet, is then transmitted past the edges of one of the Schlieren stops corresponding to the desired page to be read out. Then, one of the corresponding lenslets in the first fly's eye lens focuses the readout radiation, which has thus passed by the edges of the corresponding Schlieren stop, onto an array of photodetectors. These photodetectors are advantageously arranged in an array which is located in optical registry, and on the opposite side of a beam splitter, with respect to the array of write-in optical sources. Thereby, the page of information, which had been supplied by the array of write-in optical sources and had been written into the corresponding page portion of the memory sheet, is read out all at once by the array of photodetectors.

BRIEF DESCRIPTION OF THE DRAWING

This invention can be better understood from the following detailed description when read in conjunction with the FIGURE, which schematically illustrates an optical memory system in accordance with the specific embodiment of the invention. For the sake of clarity only, the drawing is not to scale.

DETAILED DESCRIPTION

As shown in the FIGURE, a memory sheet 10 is located between a first fly's eye lens plate 11 and a second fly's eye lens plate 12. As described in the aforementioned publication of L. H. Lin and H. L. Beauchamp (at p. 2089, FIG. 1; p. 2090, FIG. 4), the memory sheet 10 is in the form of a thermoplastic resin — photoconductor film on a glass substitute, which is provided with an array of say M by N (typically 24 by 24) transparent heating resistor elements, together with a corresponding array of electrodes and access wiring circuitry. For example, the heating resistor elements can take the form of thin film tin oxide resistors. These heating elements can be selectively energized with electrical current pulses from the electrical power source 21 (typically 9 to 14 volts r.m.s.), controlled by suitable selective control switching apparatus 20. The thermoplastic material is advantageously presensitized everywhere to optical radiation by means of a surface charging by a corona device of relatively high voltage (8 kV to 10 kV), whereas the optical transmission property of the material is modified only if the corona is followed by subsequent operations comprising the application of write-in optical radiation to the memory sheet 10, a further surface charging thereof by the corona device, and an image developing heat pulse applied to the thermoplastic. In the cases of some thermoplastics, however, it should be noted that it may be possible to omit the second surface charging of the memory sheet by the corona. In any event, the corona discharges can be produced by means of applying a separate suitably high voltage to an advantageously transparent electrode layer or mesh (not shown) located, as known in the art, in close proximity to the memory sheet 10.

Typically, the lenslets in the first lens plate 11 and 12 are characterized by an F/3.6 with a total acceptance angle of about 16°. Between the memory sheet 10 and this lens plate 11 is located an array of optical Schlieren stops 13, as described more fully below.

A first (write-in) array 14 of optical sources, say X by Y in number (typically 44 by 14) and capable of representing a page of X by Y bits of information, is located on the side of a beam splitter 15 away from the first lens plate 11. A second (readout) array 16 of optical sources, M by N in number (typically 24 by 24), is located on the side of the second lens plate 12 away from the thermoplastic sheet 10. Each of the fly's eye lens plates 11 and 12 contains an array of M by N lenslets, each lenslet corresponding to a single page of information.

In operation of the system shown in the FIGURE, optical radiation 14.5, supplied by the first (write-in) array 14, is focused by the first fly's eye lens 11 as an image on the memory sheet 10. This image can be permanently (until erased) developed as a corresponding variation of thermoplastic film thickness, at any desired page portion thereof, by means of the application of a suitable thermoplastic image developing joule heating pulse produced by an electrical current pulse across that pair of electrodes attached to the thin film resistor located at the desired page portion. Advantageously, for this purpose, the lens plate 11 is adjuste laterally such that it focuses the optical radiation from the first array 14 onto the memory sheet 10 in the form of multiple images of the array 14, each image being in registry with a different one of the aforementioned page regions therein. Moreover, prior to supplying the desired page of information by the write-in optical radiation, it should be remembered that the memory sheet 10 should be initially electrostatically charged by treatment with the aforementioned corona device, in order to presensitize the memory sheet 10 by providing electrical charges on the surface thereof. The distribution of these electrical charges is then disturbed in the photoconductor of the memory sheet 10 by the incidence of optical write-in radiation; and this incidence of write-in radiation is advantageously followed by a further electrical charging of the memory sheet 10 by the corona device. Finally, a local joule heating pulse to the desired page permanently (until erased) will deform the thermoplastic material in the memory sheet at the desired page portion thereof, in accordance with the pattern of write-in optical radiation previously incident on this page portion, by reason of the pattern of electrostatic forces produced in the thermoplastic according to the pattern of electrical charges induced by the optical write-in radiation incident on the photoconductor. Thereby, the page of optical radiation from the first array 14 will permanently modify the transmission properties of the thermoplastic sheet only at the particular page portion of this sheet 10 across which the suitable heating current pulse is applied. By "permanently" is meant that the thickness variation in the thermoplastic persists until erased by an image erasing joule heating pulse which is larger than the image developing joule heating pulse. Even though the lens plate 11 will focus the optical radiation at all of the other-multiple page regions corresponding to the multiple lenslets in this lens plate 11, only the single desired page portion will be written in with a pattern of thickness and hence optical scattering variation, provided that the image developing heating pulse is confined, by the selective switching control 20, to heating only this desired page portion of the thermoplastic. It should be recognized that any other earlier latent images in this page portion, which may have been produced by the focus thereon of earlier optical radiation onto this page portion during the time(s) when other page portions were being written in, should advantageously be erased by a somewhat greater locally applied image erasing heating pulse (typically greater by at least about 50 percent than the image developing heating pulse).

The array of Schlieren stops 13, M by N in number, will have negligible effect, as desired, upon the wave fronts of the radiation incident upon the memory sheet 10 from the write-in array 14, provided that the Schlieren stops 13 are located suitably removed in distance from this sheet 10, as should be obvious to a skilled worker in the art. For example, these stops 13 can all be located on the surface of the first lens plate 11 as indicated in the FIGURE.

Readout of one of the various pages of information previously written and stored in the memory sheet 10 is accomplished by means of energizing the optical sources of the readout array 16 only one at a time. This one of the optical sources in the array 16 is arranged to provide radiation incident upon only one of the lenslets in the second lens plate 12, that is, the lenslet corresponding to the page to be read out. For this purpose, optical stops (not shown in the FIGURE), or other conventional means, are arranged to confine the optical radiation from this optical source in the readout array 16, as known in the art, so that this radiation is incident only upon that lenslet which corresponds to the desired page. The second fly's eye lens plate is situated such that in the absence of any previous write-in, which would perturb the optical wave front as it propagates through the thermoplastic in the memory sheet 10, all of the optical radiation from the energized source in the readout array 16 is focused by this second lens plate onto the corresponding one of the Schlieren stops 13 where this radiation is completely stopped and absorbed. On the other hand, in the case of a previous write-in of the page portion of the memory sheet 10 being interrogated, then at least some of the optical radiation from this energized readout source in the array 16 is scattered by this page of the sheet 10 and passes by the edges of the corresponding one of Schlieren stops 13; and thus this readout radiation which gets by these Schlieren stops is then focused by the first lens plate 11 (after reflection by the beam splitter 15) onto an array 17 of photodetectors, X by Y in number. This photodetector array 17 is located such that readout radiation transmitted by the first fly's eye lens plate 11 is focused thereon in a lateral position such that each of the photodetectors in this array is in optical registry with a different corresponding one of the optical sources in the write-in array 14. Thus, a whole page of information in the memory sheet 10 can be read out at one time by the photodetector array 17. This readout can be carried out with respect to any page portion of the memory sheet 10, while another page portion thereof is being simultaneously written in by means of the corona discharge device (not shown) and the selectively applied voltage from the source 21, thereby affording simultaneous read-write capability.

For redundancy of the storage of a page of information in the thermoplastic sheet 10, the following modification can be used. Instead of having the latent image in the thermoplastic material in the memory sheet 10 developed at only a single page portion by means of the local heating current pulse, the image developing heating pulse is applied across several, typically adjacent, portions (pages) of the memory sheet 10 subsequent to the arrival of write-in optical radiation 14.5 from the first array 14. Readout of the redundant storage can be achieved either by energizing just that one of the readout optical sources in the second array 16 which is arranged to provide optical readout radiation incident upon the several adjacent page portions, or by energizing several readout sources, each of which is arranged to provide readout radiation upon a different one of the several page portions. It should be recognized however that the necessity for redundancy can be avoided by verifying the accuracy of the write-in of information of each page in the sheet 10 by an immediate subsequent readout and comparison with the write-in, in order to detect an error in the write-in. Such an error can be corrected by a suitable localized erasing heat pulse applied to the page portion of the thermoplastic, followed by a fresh write-in of the same page of information.

In a typical example, the arrays 14, 16, and 17 are in the form of essentially flat rectangular arrays. Similarly, the first and second fly's eye lens plates 11 and 12 both contain an array of lenslets in mutually parallel planes. The memory sheet 10 and the array of Schlieren stops 13 are likewise arranged in planes which are mutually parallel to these planes of the first and second fly's eye lenses. In this way, optical registry and correspondence of the various elements can be easily obtained.

The beam splitter 15 typically makes an angle of 45° with the plane of the first array 14, and the plane of the second array 17 typically makes an angle of 90° with the first array 14.

By way of illustration, in a typical example, the thermoplastic resin material in the memory sheet 10 is a natural tree resin as described in the aforementioned publication of L. H. Lin and H. L. Beauchamp. This resin material advantageously is essentially transparent to the readout optical radiation emitted by the readout array 16. The thermoplastic resin is advantageously deposited on a photoconductive film and is provided with an array of electrodes together with suitable access circuitry for selectively applying heat (current pulses) from an electrical power source to local page portions of the thermoplastic material. Such a thermoplastic material as natural tree resin is sensitive locally to radiation from the first array 14 of optical sources, to the extent that an optical energy density of $1.2 \times 10^{-7}$ joule/cm$^2$ is sufficient for write-in at an optical wavelength of 7,000 angstroms when this memory sheet 10 is locally electrostatically charged by a corona of about 8 kV. The image developing heating pulse should be sufficient to heat the thermoplastic to a temperature near the softening or melting point, typically between about 60° C. and 100° C. Furthermore, in order to erase any spurious information, latent or developed (electrical charges in the memory sheet 10, or thermoplastic deformation thereof), caused by previous optical write-in radiation incident on a page portion of thememory sheet 10 to be written in, it is advantageous to apply the (larger) image erasing heating pulse to this page portion, sufficient to heat it to a higher temperature, typically over 100° C., and/or for a longer period of time than for the image developing heating pulse. This image erasing pulse should be adjusted, in any event, so that it is sufficient to smooth out any variations in the thickness of the thermoplastic and to neutralize any electrical charge distributions (the latter by increasing the electrical conductivity of the thermoplastic-photoconductor film in memory sheet 10).

In order that the write-in be confined to but a single page portion of the sheet 10 at a time, it is important that the image developing heating pulse be locally applied only to that particular page portion in the sheet 10 to be written in, and that other page portions not be heated to a temperature above 60° C.

In a typical illustration, the first array of optical sources 14 can be formed by a rectangular array 0.4 inches by 0.2 inches overall, containing 44 × 14 (X by Y) gallium phosphide semiconductor light emitting diodes, each operating at one milliampere. In such a case, for a typical gallium phosphide diode with an overall light emitting efficiency of one percent, a pulse of 5 microseconds is sufficient to form a write-in optical image on the memory sheet 10. As explained above, this optical image will be sufficient to produce a pattern of electrostatic charges according to the pattern of the image, which in turn will produce a corresponding pattern of electrostatic forces and hence deformation of the thermoplastic during the subsequent image developing heat pulse.

Erasure of information on a page portion of the thermoplastic sheet 10, for the purpose of a subsequent different write-in, can be accomplished simply by means of a localized image erasing heating pulse, greater than the image developing heating pulse as described above, applied to this page portion. Such an erasing heating pulse smooths out any of the now undesired thickness variations previously recorded in the localized page portion and neutralizes any pattern of previous electrical charges produced by earlier write-in optical radiation.

The readout array 16 can, for example, take the form of a 2.4 inch square array of 24 by 24 (M by N) gallium arsenide laser diodes which provide optical readout radiation at approximately 9,000 angstroms. Typically, the output beam is confined to a 15° cone so that essentially all of the emitted light is incident on the corresponding page on the sheet 10 to be interrogated. Gallium arsenide laser diodes can be used for the array 16 with external efficiencies of 10 percent, each of which is operated with a 3 ampere, 0.1 microsecond pulse, to produce a light pulse with 0.6 watts peak power.

By way of further illustration only, the distance between the first (write-in) array 14 and the second (readout) array 16 can be as little as about 12 inches. In order to achieve such overall compactness, the distance between the readout array 16 andthe second fly's eye lens 12 is about0.7 inches; and the distance between the second fly's eye lens array 12 and the array of Schlieren stops 13 on the first fly's eye lens 11 is also about 0.7 inches, that is, twice the focal lengths of each of the lenslets in these fly's eye lenses. The Schlieren stops 13 are typically simply tiny black (light-absorbing) dots, 0.01 inches in diameter, painted or deposited on the surface of the first fly's eye lens 11, centered with respect to each lenslet therein. The memory sheet 10 is advantageously located just slightly to the left of midway between the first and second fly's eye lenses 11 and 12, so that the first lens 11 focuses the write-in optical radiation from the write-in array 14 on the photoconductor film of the memory sheet 10. This write-in array 14 is located typically about 10 inches from the first fly's eye lens 11 in order to produce optical radiation with the typically ±8° angle of acceptance of this first lens.

It should be recognized that since photoconductor-thermoplastic films can store a latent (electrostatic charge) image, instead of writing in a whole page of information at a time from the write-in array 14, the bits of information can be written in one at a time by optical radiation from the optical sources in the write-in array 14 one at a time, or by a multiplicity of such sources at a time (such as only one line of a page at a time). Thereafter, a suitable heating pulse is applied to the entire page portion of the thermoplastic memory sheet 10 in order to develop locally the latent image. Thereby, the access circuitry to the write-in array 14 can be simplified.

While this invention has been described in terms of specific embodiments, various modifications can be made without departing from the scope of the invention. For example, instead of the memory sheet 10 containing a thermoplastic film, coarse grain ferroelectric ceramic plates, such as lanthanum doped 65/35 lead zirconate-titanate, can be used in conjunction with photoconductive layers. In such ferroelectric memory devices, the optical scattering properties of the ferroelectric can be permanently locally modified by means of incident radiation in the presence of suitable locally applied voltages or voltage pulses. Likewise, fine grain ferroelectric ceramics, whose optical delay properties can be modified by incident radiation in the presence of applied voltage can be used for the material of the memory sheet 10 in conjunction with optical polarization techniques (polarizers and analyzers), as known in the art; and thereby the array of Schlieren stops 13 can be omitted. See: A. H. Meitzler and J. R. Maldonado, "Ferroelectric Display's Big Bonus: Selective Erase/-Write Capability," *Electronics*, Vol. 44, Feb. 1, 1971, pp. 34–39.

What is claimed is:

1. An optical memory system which comprises:

a. a memory sheet of material whose optical transmission property at any selected page region can be locally modified by incident optical write-in radiation;

b. first and second lens matrices located on opposite sides of the sheet;

c. a first optical array of individual optical sources capable of producing a controllable pattern of optical write-in radiation incident upon the first lens matrix in a first direction and which is focused by each of the lenslets in the first lens matrix on a different page portion of the sheet, whereby the optical transmission property of the sheet can be modified in accordance with the pattern at one or more of said page portions; and d. a second optical array of individually controllable sources of optical readout radiation, each of which is arranged to furnish readout optical radiation incident in the opposite direction from the first direction upon at least one different lenslet in the second lens matrix, thence past an optical stop means in an array of such optical stop means and through a lenslet of the first lens matrix for focusing on an array of photodetectors, each of such lenslets arranged to transmit said readout optical radiation to a different page portion of the sheet.

2. The system recited in claim 1 which further includes an array of photodetectors upon which optical radiation from the second optical array is incident after transmission respectively through the second lens, the sheet, and the first lens; and each photodetector being in optical registry with a different one of the optical sources of the first optical array.

3. The system recited in claim 1 in which the memory sheet comprises a thermoplastic material.

4. The system recited in claim 3 in which the memory sheet comprises a thermoplastic resin.

5. The system recited in claim 3 in which there is further provided the array of optical stop means, said stop means located between the memory sheet and the first lens such that each of said stop means absorbs optical radiation from a corresponding different one of the page portions in the memory sheet in the absence of any previous write-in radiation from the first optical array incident upon said page portion when said page portion was simultaneously sensitized to the write-in radiation incident upon said page portion.

6. The system recited in claim 3 which further includes means for locally developing at least a page portion of the thermoplastic material.

7. The system recited in claim 6 in which the means for sensitizing the material includes means for controllably heating the material at selected page portions.

8. The system recited in claim 6 in which the means for locally developing the material includes means for applying a heat pulse locally to said material.

* * * * *